United States Patent [19]

Reich

[11] Patent Number: 4,816,275

[45] Date of Patent: Mar. 28, 1989

[54] DECAFFEINATION OF AQUEOUS EXTRACTS

[75] Inventor: Ismar M. Reich, Merrick, N.Y.

[73] Assignee: Chock Full O'Nuts Corp., New York, N.Y.

[21] Appl. No.: 129,801

[22] Filed: Dec. 7, 1987

Related U.S. Application Data

[63] Continuation-in-part of Ser. No. 60,956, Jun. 15, 1987, abandoned, which is a continuation of Ser. No. 821,868, Jan. 23, 1986, abandoned, which is a continuation of Ser. No. 479,263, Mar. 28, 1983, abandoned.

[51] Int. Cl.$^4$ .................................................. A23F 5/20
[52] U.S. Cl. .................................... 426/422; 426/424; 426/490; 426/492; 426/495; 99/289 P
[58] Field of Search ............... 426/427, 428, 432, 386, 426/387, 388, 492, 481, 495, 490, 595, 422, 424

[56] References Cited

U.S. PATENT DOCUMENTS

| | | | |
|---|---|---|---|
| 2,309,092 | 1/1943 | Berry et al. ........................... | 99/70 |
| 3,879,569 | 4/1975 | Vitzthum et al. .................... | 426/427 |
| 3,969,196 | 7/1976 | Zosel ..................................... | 203/49 |
| 4,246,291 | 1/1981 | Prasad et al. ......................... | 426/387 |
| 4,251,559 | 2/1981 | Margolis et al. ..................... | 426/490 |
| 4,260,639 | 4/1981 | Zosel ..................................... | 426/478 |
| 4,322,445 | 3/1982 | Peter et al. ........................... | 426/312 |
| 4,328,255 | 5/1982 | Roselins et al. ..................... | 426/417 |
| 4,341,804 | 7/1982 | Pracad et al. ........................ | 426/387 |
| 4,348,422 | 9/1982 | Zosel .................................... | 426/475 |
| 4,349,415 | 9/1982 | DeFillippi et al. ................... | 203/14 |

FOREIGN PATENT DOCUMENTS 0111375  6/1984  European Pat. Off. .
2638383  3/1977  Fed. Rep. of Germany .
314059   6/1929  United Kingdom .

OTHER PUBLICATIONS

Akell, R. B., Chemical Engineering Progress 62 (9), 1966, p. 50.

Caragay, A. B., et al., "Supercritical Fluids for Extraction of Flavors and Fragrances from Natural Products," Perfumer and Flavorist 6, pp. 44–55 (Aug. 1981).

Davies, G. A., et al., The Chemical Engineer (London), No. 266, p. 392 (1972), [discusses Coalescence of Liquid-Liquid Emulsions with a Proprietary Mesh Structure.]

King, C. J., "Separation Processes," McGraw-Hill, New York (1980), p. 765.

McHugh, M. A., and Krukonis, V. J., "Supercritical Fluid Extraction." Butterworth, Stoneham, MA (1986).

Oliver, E. D., "Diffusional Separation Processes," John Wiley, New York (1966), p. 363.

Perry, Chemical Engineers' Handbook, 6th Ed., McGraw-Hill (1984), p. 18 70-88.

Rizvi, S. S. H., et al., "Supercritical Fluid Extraction: Fundamental Principles and Modeling Methods," Food Technology, (Jun. 1986, p. 55).

Treybal, R. E., "Mass Transfer Operations," McGraw-Hill, New York (1980), pp. 532 to 535.

Primary Examiner—Marianne Cintins
Attorney, Agent, or Firm—Gottlieb, Rackman & Reisman

[57] ABSTRACT

Green coffee is decaffeinated in a continuous economical process without organic solvent. Caffeine is extracted from a solution of green coffee solubles with supercritical carbon dioxide in a novel extractor under specified conditions.

16 Claims, 2 Drawing Sheets

DECAFFEINATION OF AQUEOUS EXTRACTS

This application is a continuation-in-part of U.S. patent application Ser. No. 0,60,956 filed June 15, 1987, now abandoned, which is a continuation of application No. 821,868 filed Jan. 23, 1986 which was a continuation of application No. 479,263 filed Mar. 28, 1983, now abandoned.

BACKGROUND OF THE INVENTION

The present invention relates generally to extraction processes and more particularly to a decaffeination of coffee by a continuous extraction process. A caffeine-laden aqueous extract of green coffee is prepared from which caffeine is extracted by the use of carbon dioxide as a solvent. The invention lies in the use of specific equipment under closely controlled conditions of pressure and temperature to provide high yields and economical costs of production.

In recent years, consumer demand for decaffeinated coffee has been increasing. About 20% of the coffee sold in the United States is decaffeinated. Most of this coffee is now decaffeinated in processes which employ synthetic organic solvents such as methylene chloride or ethyl acetate, either by directly contacting the coffee beans with the extracting organic solvent or indirectly, by contact of coffee beans with solvent-decaffeinated coffee extract.

There is public concern that decaffeinated coffee may contain inadvertent traces of organic solvent which might be toxic or carcinogenic. Furthermore, organic solvents remove other coffee constituents along with caffeine to the detriment of the coffee flavor. There has thus arisen a need for a process which does not use organic solvent.

The use of pressurized gases as solvents has long been known. For example see M. Centnerszwer, Z. Physik. Chem. 46, 427 (1903); H. Buchner, Z. Physik. Chem. 54, 665 (1906); M. Centnerszwer, Z. Physik. Chem. 72, 431 (1910); D. B. Todd and J. C. Elgin, A.I. Ch. E. Journal 1, 20 (1955).

Carbon dioxide, a normal constituent of roasted coffee, is a preferred solvent for decaffeination. It is produced naturally during the roasting process, typically to the extent of 2 to 3% of coffee weight. It is non-toxic and will selectively remove caffeine from coffee beans or coffee extract. It may be used for decaffeination at elevated pressure although much more carbon dioxide is required than conventional organic solvents. Consequently, for economic operation, highly efficient decaffeination equipment is required.

U.S. Pat. No. 4,260,639 to Zosel discloses a slow process, not readily made continuous, for the carbon dioxide decaffeination of coffee from batches of moistened green coffee beans in a period of 5 to 30 hours. In that process each batch of green (unroasted) coffee beans is extracted in a high pressure vessel which must be charged and closed. The carbon dioxide must then be admitted and pumped to a high pressure before decaffeination can be effected. After decaffeination the pressure must be released slowly so that the beans do not fracture by expansion of the carbon dioxide inside the beans. The vessel is then opened to discharge the decaffeinated coffee. The cost and time required for loading, caffeine extraction and unloading and the cost of re-pressurizing the carbon dioxide after each batch make this process economically unattractive.

An indirect "water process" decaffeination method is described in British Patent No. 314,059 to Klapproth and U.S. Pat. No. 2,309,092 to Berry et al. However, they employ an organic solvent, generally a chlorinated solvent, to decaffeinate an aqueous solution of green coffee solubles. The aqueous solution is then used to extract caffeine from green coffee beans. The caffeine-laden solution is recycled to the solvent. If water were used instead of the aqueous coffee solution, most of the coffee flavor precursors which develop flavor and aroma on subsequent roasting would be lost with the water and a substantial part of the coffee weight would also be lost. Recycling of the solution results in the removal from the coffee of primarily only those components (principally caffeine) which are extracted by the organic solvent from the solution. The "water process" has also been modified by others to use solid adsorbents such as activated carbon instead of a chlorinated organic solvent to remove caffeine from the solution. This method has the disadvantage that some other coffee components are removed as well as caffeine, reducing yield and weakening the coffee flavor. See for example, European patent application 111,375 to Moolweer.

German patent application No. 2,638,383 to van der Stegen describes a continuous process which substitutes carbon dioxide for the chlorinated organic solvent in the "water process". The van der Stegen suggestion has the advantage that coffee beans can be extracted with a water solution at low or atmospheric pressure and only this solution need be handled at elevated pressure in contact with carbon dioxide. The van der Stegen idea has been open to public inspection since Mar. 3, 1977, yet there has been no known commercial application of the process.

Extraction requires the transfer of a solute (caffeine) from one fluid (green coffee extract) to a second fluid (pressurized carbon dioxide). Close contact of the fluids followed by their effective separation is essential. Generally a series of such contacts and separations arranged countercurrently is required for efficient extraction. I have found that the green coffee extract has a strong tendency to form a foam when intermixed with pressurized carbon dioxide. This foam makes caffeine extraction and separation of the carbon dioxide from the solution as suggested by van der Stegan impractical in equipment of conventional design.

Packed extraction columns, such as described in U.S. Pat. No. 4,348,422 to Zosel are unsuitable because there is considerable vertical (axial) mixing of the two fluids resulting in poor efficiency and increased cost of operation. This is particularly severe in systems employing supercritical gases such as carbon dioxide; its low viscosity (about one fifteenth that of water) increases eddy flow and thereby interferes with the countercurrent contacting required for efficient extraction.

Mechanically assisted columns such as "rotating disc" columns or "Scheibel" columns are also subject to axial mixing. The mechanical agitation also promotes formation of emulsion or foam which inhibits separation of the two fluids.

Sieve plate extraction columns are well known to effectively prevent backmixing. See C. J. King "Separation Processes" McGraw-Hill, New York 1980, page 765. Attempts to decaffeinate green coffee extract with carbon dioxide in a conventional sieve plate column were unsuccessful. Contact and almost complete separation of the two fluids between successive plates in the column are essential for proper operation. Conventional design does not achieve this. Supercritical carbon dioxide in passing upward through plate perforations and through a green coffee extract forms a persistent foam which prevents operation of the process.

Prior to the instant invention, there has not been an economical and efficient countercurrent extraction process for the decaffeination of coffee in a continuous process employing supercritical carbon dioxide and no organic solvents.

SUMMARY OF THE INVENTION

An object of this invention is to provide a method for making decaffeinated coffee efficiently and economically without the loss of coffee flavor and aroma precursors and without introducing any organic solvent or other additive.

It is an object of the present invention to provide an economical and efficient continuous process employing a sieve plate column for the extraction of caffeine by supercritical carbon dioxide from an aqueous extract of green coffee beans.

It is a further object of the present invention to enhance the efficiency of such processes by providing means to inhibit the flooding caused by separation-inhibiting foam. A further object of the present invention is to provide in conjunction with novel high pressure decaffeination apparatus a method for the operation of such apparatus to provide the efficient and economical decaffeination of coffee.

A further object of the present invention is to provide novel sieve column decaffeination apparatus having optimized anti-foam mesh area and void percentages.

A further object of the present invention is to provide a novel perforated plate column decaffeination apparatus including a foam suppressing mesh network used in conjunction with the discovered method of operation.

A further object of the present invention is to provide, in conjunction with novel decaffeination apparatus, a method of operation at optimal pressure, temperature, extract concentration, extract flow rate and carbon dioxide flow rate to render the process economical and efficient.

Still other and further objects of the present invention will be apparent from the detailed description which follows.

I have discovered that an unexpected combination of extraction equipment design and operating conditions attains the foregoing objectives.

The apparatus and technique disclosed herein may be used in decaffeinating extracts of roasted or of gree coffee. The preferred application is to the decaffeination of green coffee extract to be used to produce decaffeinated green coffee beans. Decaffeination of green coffee extract avoids loss during decaffeination of delicate and fugitive coffee flavors and aromas developed subsequently by roasting.

Carbon dioxide is used at elevated pressure. It is preferred to other known decaffeination solvents because it is non-toxic and, under suitable conditions, highly selective for caffeine. However, it has some disadvantages. Although very selective for caffeine, carbon dioxide is a relatively poor solvent for caffeine. Efficient extraction requires a relatively high ratio of carbon dioxide to coffee solution of approximately 30 to 35 is required for 99% decaffeination. The extremely low viscosity of supercritical carbon dioxide also affects extractor design.

In accordance with preferred embodiment of this invention a liquid-liquid extraction column of unique design is employed. Above its critical temperature (87.8° F.), carbon dioxide cannot exist as a liquid regardless of the pressure and is therefore called a supercritical fluid. At the elevated pressure used in the process to be described, the fluid approaches the density of some liquids. The present invention employs equipment designed for continuous countercurrent contact of two liquids. Such equipment is an improvement for the present purpose upon the prior art.

The present invention avoids the limitations found in a packed extraction column or a mechanically assisted column. Those columns are incapable of handling high solvent ratios of 10 or more. See R. B. Akell, Chemical Engineering Progress 62 (9) 1966 page 50 and E. D. Oliver, "Diffusional Separation Processes" John Wiley, New York 1966 page 363.

It has now been discovered that modifying the design of a sieve plate column permits practical and economic decaffeination within limited ranges of operating conditions. A porous material providing an extended solid surface is placed above the liquid surface so as to contact the foam rising from the liquid. It was found that the surface acted to "break" the foam and permit good operation of the extraction column. Anti-foam compounds were unacceptable here because chemccal additives are incompatible with a "natural" food product. Control of the foam solely by physical means was accomplished.

Surprisingly, it was also discovered that this foam "breaking" by surface contact operates satisfactorily only when the system pressure is greater than about 330 bar. Performance is better at about 380 bar and still better at about 420 bar. Tests made at pressures up to about 480 bar did not indicate any further improvement in separation. Since equipment costs increase as system pressure is increased, operation at about 420 bar is preferred for economy.

Gravity causes the separation of two fluids by virtue of the difference in their densities. One would expect that the greater the density difference, the more effective the separation. This was discovered not to be true with supercritical carbon dioxide and aqueous green coffee solution within the range of pressure indicated above. Carbon dioxide is the lower in density of the two. As system pressure is increased, carbon dioxide density increases while the aqueous solution remains almost unchanged. Thus, the density difference decreases as system pressure is increased. Therefore, the discovered improvement in separation efficiency with increased pressure could not be anticipated.

Furthermore, it is known that increased pressure increases the mutual solubilities of carbon dioxide and water which reduces their interfacial tension. Foam coalescence is favored by increased interfacial tension. Again, the discovered effect of increased pressure is contrary to expectation.

The preferred extraction temperature is about 80° to 85° C. Temperatures from about 75° to 100° C. can be used. However, above about 85° C. there is a slow deterioration and discoloration of the aqueous green coffee extract. Temperatures below about 80° C. increase foam viscosity in the extractor although the effect of small temperature changes nn viscosity of unfoamed extract is extremely small. Increased foam viscosity can interfere with extractor operation even under otherwise optimum conditions.

The concentration of the aqueous green coffee solution may be between about 18% and about 30% dissolved solubles. At higher concentrations the foam viscosity apparently increases excessively, again despite a very small change in viscosity of the unfoamed solution. Surprisingly, the tendency to foam is increased at lower solubles concentration. Operation is best in the range of 22 to 27% solubles, preferably about 26%.

The structure of the porous solid surface employed to break the foam is very important. In general, the larger the surface area made available, the better the performance. However, practical extractor design is limited by two other factors the hydraulics of sieve plate extractors and the commercial availability of suitable materials.

The hydraulic relationships of conventional sieve plate extractors are well known. See, for example, R. E. Treybal "Mass Transfer Operations", McGraw-Hill, New York 1980, pages 532 to 535. The maintenance of suitable layers of solution on the plates is affected by flow rates, fluid densities, and the physical design and dimensions of plates, perforations, etc. The addition of surface area for foam breaking can greatly affect the extractor hydraulics and cause the column to fail to operate. It has been discovered that only a limited range of structures is effective for foam breaking without interference with extractor functioning.

Absent the porous material discovered to break foam, the column fills with foam and fails to function (floods) almost immediately on startup.

DETAILED DESCRIPTION OF A PREFERRED EMBODIMENT OF THE INVENTION

Figure 1:
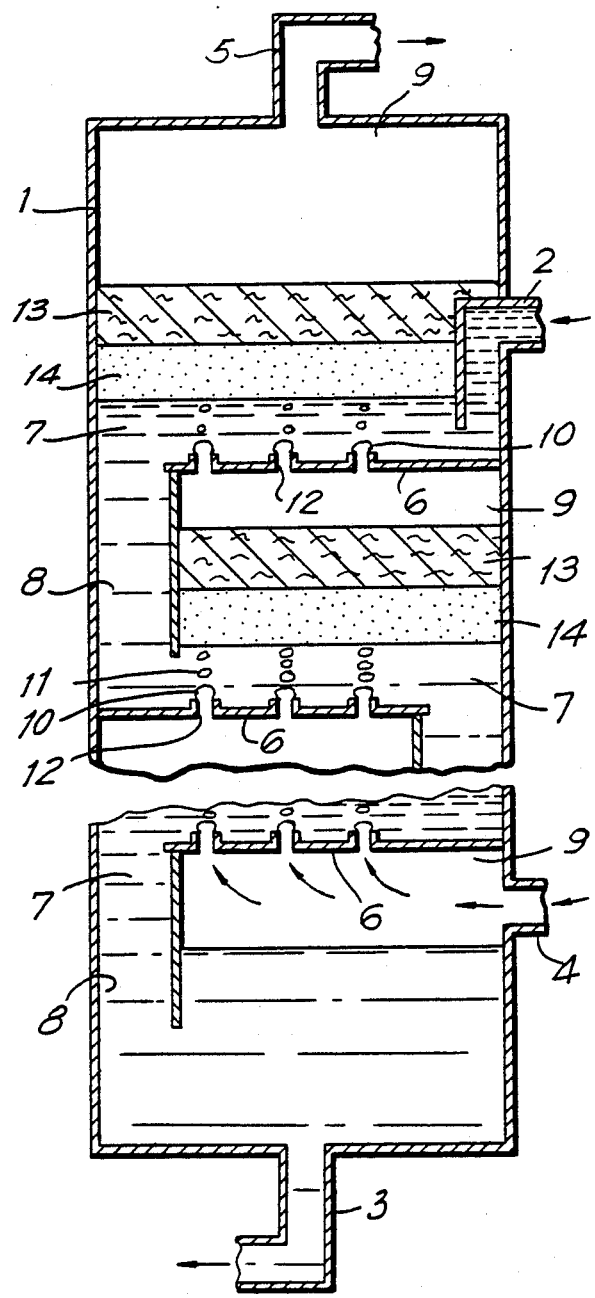
FIG. 1 is a schematic illustration of a sieve plate extraction column equipped with porous foam-breaking material of this invention. The view is a vertical section at a diameter of a cylindrical extraction column.

The preferred embodiment of the sieve plate extraction column 1 of the present invention is shown in FIG. 1. The column is capable of safely sustaining the preferred operating pressure of 420 bar. Inlet port means 2 allows aqueous green coffee extract containing caffeine to be introduced under pressure near the top of the column. Extract outlet port means 3 allows decaffeinated green coffee extract to leave the bottom of the column. Carbon dioxide input port means 4 allows carbon dioxide containing very little or no caffeine to enter under pressure near the bottom of the column. Carbon dioxide output port 5 allows carbon dioxide laden with caffeine removed from the aqueous extract to leave at the top of the column. The perforated sieve plates are depicted at 6. For clarity only three plates are shown although the column may contain any number of plates. The plates and other components of the column are arranged so that green coffee solution 7 forms a continuous body of liquid from inlet port 2 to its outlet port 3, constituting a continuous phase. The liquid being more dense than carbon dioxide, the system is configured so that the continuous phase solution flows downward through the column but is constrained to flow generally horizontally across each plate and then downward to the next lower plate through a channel called a downcomer 8. The liquid cannot fall through the perforations on the plates because the carbon dioxide is rising through all the perforations at sufficient velocity. The plates 6 have no perforations directly beneath the bottom of downcomers where rising bubbles would interfere with liquid flowing down the downcomers. Carbon dioxide 9 is the dispersed phase. In operation tt rises through the extraction column because its density is lower than that of the coffee solution. It forms small jets 10 which break into bubbles 11 in passing through perforations 12 in the plates 6 and then through the layer of liquid maintained on the plates. A porous foam breaking material 13 presenting exposed solid surface for breaking foam is spaced above the liquid layer. The porous material fills the available cross-section in the extractor to prevent rising foam from passing through channels without contacting the material.

Suitable surface materials for foam breaking include stainless steel and polytetrafluoroethylene. Stainless steel is preferable because it is wetted by the collapsed foam which then drains more easily by capillary action and gravity, returning to the solution layer. In contrast, the surface of polytetrafluoroethylene tends to become loaded with collapsed foam especially at high carbon dioxide flow rates. The effect is a tendency to cause the column to "flood" and the aqueous solution to empty from the column.

Furthermore, polytetrafluoroethylene is difficult to fabricate with a large surface area. A somewhat similar material, polyfluorinated ethylene-propylene, is much easier to fabricate. However, it deteriorates mechanically by swelling in supercritical carbon dioxide.

A surface area of at least about 12 square centimeters per cubic centimeter of knitted wire is needed to break foam. A large void fraction minimizes resistance to flow of the carbon dioxide. Suitable porous material can be made from knitted stainless steel wire. Such materials are sold by Koch Engineering Company, Inc., as well as others, for use as mist eliminators in distillation or evaporation equipment. Table I presents data on coffee foam breaking by knitted stainless steel wire materials in an extraction column under constant operating conditions while decaffeinating a solution of green coffee solubles with supercritical carbon dioxide.

TABLE I

| Surface Area cm$^2$/cm$^3$ | 3.6 | 11.2 | 14.8 | 20.0 | 23.0 |
|---|---|---|---|---|---|
| Bulk Density g/cm$^3$ | 0.112 | 0.240 | 0.320 | 0.433 | 0.497 |
| % Voids | 98.6 | 97.0 | 96.0 | 94.6 | 93.8 |
| Foam-Breaking Effectiveness | Ineffective | Fair* | Good | Very Good | ** |

*Operable only at relatively very low carbon dioxide flow rate.
**Could not be evaluated because excessive pressure drop in the material caused the column to flood.

In operation foam 14 which forms from the carbon dioxide bubbles and the coffee solution fills the space above the liquid and partially penetrates the foam-breaking material. Carbon dioxide 9 leaves the top of the foam-breaking material substantially free of liquid. Liquid formed by the collapse of the foam drains back to the liquid layer.

The term extraction stage is used to refer to a unit within which both contact and separation of the two fluids take place. A perforated plate 6 is at the bottom of each stage. In operation of the extraction apparatus a very large area of contact is created by the carbon dioxide bubbles formed in passing up through the plate perforations, the gas flow rate being much greater than the liquid rate. This facilitates transfer of caffeine to the carbon dioxide approaching an equilibrium concentration.

Efficient extraction is effected by use of a number of extraction stages, stacked vertically, so that the fluids flow countercurrently, the stack comprising an "extraction column." The preferred number of stages can be calculated by conventional means known to persons skilled in the art, such as the McCabe-Theile method. Although equilibrium distribution of caffeine between the two fluids may be approached in each stage, the countercurrent arrangement imposes a new equilibrium goal in each successive stage so that the concentration of caffeine in the coffee solution leaving the bottom of the extractor is far below that which would be in equilibrium with the carbon dioxide leaving the top.

A major factor affecting the number of stages and the quantity of carbon dioxide required is the "distribution coefficient." It is defined as the ratio of the caffeine concentration in carbon dioxide to that in the aqueous solution after the two fluids have experienced sufficient contact to reach equilibrium (when no further transfer of caffeine is detected). Under the preferred operating conditions of this invention the distribution coefficient was found to average about 0.035, slightly lower at low caffeine concentrations and slightly higher at high concentrations. Increasing the system pressure increased the distribution coefficient. No effect of temperature on the distribution coefficient was found within the preferred temperature range of 80°–85° C.

The system is designed and operated, as described below, so that a thick layer of coffee solution is maintained on every plate. This assures that the gas jets issuing from the plate perforations can form droplets in the liquid and provide the needed large contact area between the two fluids. If the layer is too thin, the gas will push away the liquid above each plate perforation and minimize contact and extraction efficiency. Furthermore, sufficient liquid is needed to provide a liquid seal to prevent gas from rising through the downcomers instead of through the plate perforations. The liquid height may be regarded as the intrastage interface level between liquid and gas. The depth determines the quantity of coffee extract inventory in the extractor. For practical reasons it is desirable to minimize this inventory. Furthermore, the top of the liquid layer should be kept spaced below the bottom of the porous foam-breaking material which becomes less effective if submerged in liquid. Experience has shown that the layer should be at least about 20 mm and preferably about 35 to 50 mm deep.

Flow of the two fluids in opposite directions is driven by their difference in density. Both flows overcome inherent resistances which produce pressure drops as a function of flow rate. Any pressure drop increase caused by an increased flow rate or increase in any flow resistance lowers the depth of liquid on the plates. The depth may be regarded an analogous to one leg of a manometer used to measure pressure drop. Gas or foam which finds its way into the downcomers reduces the effective liquid density and reduces the force available to drive the flow, also reducing the liquid layer depth.

Liquid pressure drop is caused by flow resistance in the downcomers and by flow direction changes in entering and leaving the downcomers. Gas pressure drop is affected by the number and size of perforations through which the gas must pass and, to a small extent, by interfacial tension which must be overcome to form bubbles of gas.

The porous foam-breaking material of this invention adds resistance to the gas flow and would be expected to interfere with extraction operation. It has been discovered, however, that in accordance with this invention foam-breaking performance is effective at velocities of about 0.1 to 0.15 meters per second through the plate perforations. These rates are typical of industrial sieve plate extractors operating with non-foaming systems. The results shown in Table I were obtained at a perforation gas velocity of about 0.12 meters per second.

The foam-breaking material must be optimized for best results. Increased exposed surface area increases foam-breaking action but also increases the gas pressure drop and depresses the liquid layer depth. Also, porosity (percent of voids) of the material affects pressure drop; materials of smaller porosities cause greater pressure drops.

In the practice of this invention, it was found advantageous to provide downcomers which have much larger cross-sectional area than in conventional design. Large downcomers reduce liquid velocity and permit disengagement of foam which may be entrained into the downcomer along with liquid. The pressure drop can be regulated by installing a orifice at the bottom of each downcomer to reduce liquid depth on the plates. These orifices can also facilitate startup of the extractor by limiting initial flow of gas up the downcomers.

The effectiveness of the foam-breaking surface also can affect liquid layer depth. For example, use of a mesh with a relatively large void percentage and a relatively small surface area is expected to cause a smaller pressure drop. However, when there is insufficient area for efficient foam breaking, the foam tends to fill the voids and restrict free flow of the gas with resulting excess pressure drop, reduced liquid depth and, eventually, an extractor emptied of liquid.

Similarly, a bed of foam-breaking material with a height of 150 mm provided more area and was more effective than a 75 mm bed of the same material despite expected increased pressure drop.

The viscosity of green coffee solution is very close to that of water. However, foam formed from the solution has a much higher viscosity than the solution and increases with increases in solution concentration. Very viscous foam fails to drain well from the porous material and increases resistance to carbon dioxide flow through the porous material. A concentration not over about 27% solubles is preferred although satisfactory operation has been carried out at somewhat higher concentrations.

It has been found that the ability to eliminate the effects of foaming is critical to the operation of the decaffeination process. Failure to defoam well is manifested in the same way as excessive interstage or intrastage pressure drops. Liquid height on the trays declines, allowing foam to enter the downcomers. The foam having a density intermediate between liquid and gas, there is no longer sufficient density difference to drive the liquid downward by gravity. Liquid and foam may actually flow up the downcomers driven by the gas flow. Gas leaves the bottom of the column in place of liquid which has failed to come down. At the same time, unless the liquid feed to the top of the column is stopped, liquid or foam may be carried out with the gas leaving the top and the column is said to be "flooded".

During operation, the depth of liquid on the plates can be calculated from the liquid inventory obtained by metering the coffee solution entering and leaving the column since startup. Alternatively, it can be measured on shutdown by stopping both liquid and gas flows and draining the liquid. The liquid normally drains quickly if the foam breaking has been operating well. If not, draining will be slow and it may be necessary to reduce system pressure to below about 70 bar in order to decrease the density of the gas sufficiently to allow foam to flow downward and coalesce to a liquid.

In addition to controlling the intrastage interface level, control of the interface level above the top plate known as the principal interface level is necessary. Conventionally in liquid-liquid columns the denser liquid is fed above the top plate and the rate of discharge of liquid from the bottom of the column is controlled by means of a throttling valve in the discharge line which responds to the top interface level measured by an instrument. As the level rises incrementally the throttling valve opens proportionally to provide control. This technique was found to be unstable in the present system because when the valve opened and liquid flow increased, the liquid pressure drop increased in each stage causing the liquid depth on the plates to fall and resulting in a temporary rise in the top interface level. Furthermore, there was a considerable time delay until discharge rates could be sensed at the column top. It was found that stable control was obtained by providing a constant rate of decaffeinated liquid discharge from the bottom of the column and arranging for variable feed rate of undecaffeinated liquid extract to the top of the column in response to the level instrument.

An alternative sieve plate column design commonly used for distillation operations where there is a large density difference between liquid and vapor was found to be less suited for the present process. The liquid path is not continuous and the principal interface is located below the bottom plate. That design has the advantage that intrastage interface levels are set by means of overflow weirs on each plate. However, liquid spilling over the weirs entrains gas to produce foam in the downcomers which prevents continued operation.

The extract decaffeination operation is but one part of a preferred process for decaffeinating coffee. Application of the decaffeinated extract to decaffeinate green coffee beans and the recovery of caffeine-laden carbon dioxide are simultaneous operations which must be integrated with the extract decaffeination. To take best advantage of the continuous extract decaffeination column, the other steps are preferably continuous. Advantages of continuous operation include product uniformity, simplified automatic control, minimal process inventory and generally smaller, more economical equipment.

Figure 2:
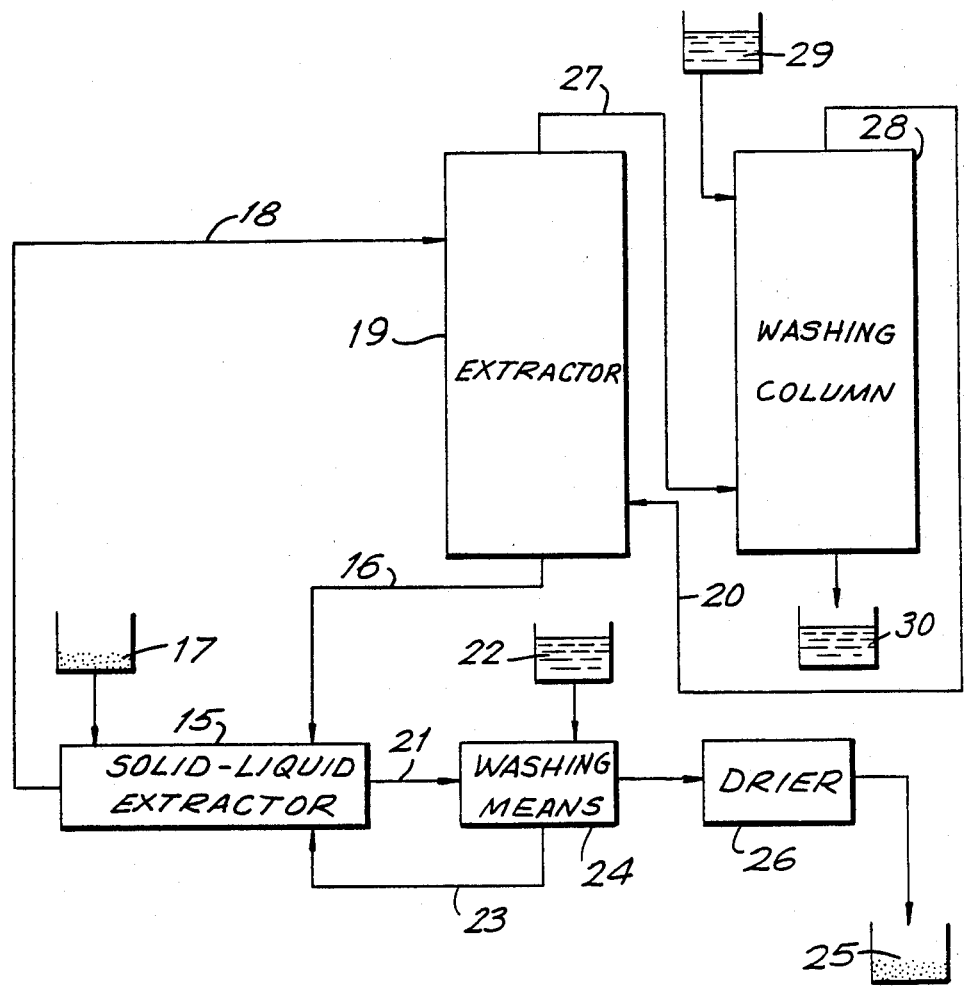
FIG. 2 is a schematic illustration of the system employing the sieve plate extraction column of FIG. 1 in a continuous process.

Referring to FIG. 2, the preferred system comprises a solid-liquid extractor 15 in which both decaffeinated aqueous extract 16 and undecaffeinated coffee beans 17 move continuously in opposite directions.

Although the countercurrent batch extraction system "water process" described in Berry et al, U.S. Pat. No. 2,309,092, could be used, it is not a truly continuous extractor. The extent of decaffeination obtained depends, inter alia, on the bean residence time while caffeine is extracted by the green coffee solution. The system of the present invention has advantages over that of Berry. Berry et al required 8 hours at 200° F. to reach 98% decaffeination. Table II gives results obtained with a continuous process at the same temperature.

TABLE II

| Bean Residence Time | % Decaffeination |
|---|---|
| 5.3 hours | 96.7 |
| 5.8 hours | 98.4 |
| 6.4 hours | 99.1 |

The advantage of continuous extraction probably is that channeling in static beds of beans is avoided.

The green bean extract travels in a continuous loop. Caffeine-laden ("rich") extract 18 from the end of the bean extractor 15, where fresh green beans 17 enter, is sent to the top of the extraction column 19 where it meets carbon dioxide 20 which enters the bottom of the column. Decaffeinated ("lean") extract 16 from the bottom of the column is returned to the opposite end of the bean extractor where the decaffeinated beans 21 leave. Fresh water 22 must be added to make up for moisture absorbed by the beans. This water is conveniently used to wash extract from the surface of the decaffeinated beans before the wash 23 goes to the bean extractor. Washing means 24 is needed to prevent lumping of beans and loss of solids and flavor during subsequent drying. The dry decaffeinated beans 25 are discharged continuously from drier 26.

In the preferred continuous process, caffeine must be removed simultaneously from the carbon dioxide 27 which has decaffeinated the coffee extract to allow re-use of the carbon dioxide for economy. This might be done by filtration through a bed of activated carbon but again economy demands recovery of the carbon. That is difficult because carbon holds caffeine tightly and carbon recovery may require incineration with associated heating and cooling costs as well as loss of caffeine.

Removal of caffeine from the carbon dioxide by means of washing with water is preferred. This can be accomplished in a second sieve plate extraction column 28 of similar design to the extractor 19 used to decaffeinate the extract. It was found that the same foam-breaking means used in the extraction column is necessary for satisfactory operation of this carbon dioxide washing column. Pure water 29 is fed to the top of the column while the carbon dioxide containing dissolved caffeine 27 is fed to the bottom. Carbon dioxide 20 substantially free of caffeine exits the top of the column to be recycled to the bottom of the coffee extract decaffeination column 19 to form a second loop. Water containing caffeine 30 exits the bottom of the carbon dioxide washing column 28. Caffeine may be recovered from the water solution. The selectivity of carbon dioxide for caffeine is illustrated by the purity of the solids obtained by drying the solution. It typically exceeds 95% caffeine before further refining.

It is desirable to operate both extraction columns in the carbon dioxide loop 19 and 28 at about the same pressure to minimize energy cost for compression. Similarly it is best to operate both columns at about the same temperature to minimize costs for heating and cooling. Water dissolves in pressurized carbon dioxide to a small extent depending on temperature. If the carbon dioxide washing column is hotter than the coffee extract column, the circulating carbon dioxide will dilute the extract; if cooler, it will make the extract become more concentrated during decaffeination.

To achieve a high degree of decaffeination of the coffee extract, the carbon dioxide entering the extract decaffeination column must have no more than about 2 to 3 parts per million of caffeine. This very low level depends on the efficiency of the carbon dioxide washing column. Caffeine level in the carbon dioxide is not easily measured directly. However, a simple expedient was found to serve. A small portion of the low-caffeine carbon dioxide stream is cooled and passed through a vessel where some water is allowed to condense and settle. Since the condensed water is in equilibrium with the carbon dioxide, caffeine analysis of a sample of this water may be used to calculate the caffeine level in the carbon dioxide by applying a predetermined distribution coefficient of caffeine dissolved in carbon dioxide in contact with water. This distribution coefficient is about 0.1. (The distribution coefficient for carbon dioxide in contact with coffee extract was 0.035 which implies that coffee extract has a greater "affinity" for caffeine than does water.)

The effectiveness of the extract decaffeination column can be assessed by caffeine analyses of samples of the entering and exiting extract streams, provided that the entering carbon dioxide is sufficiently low in caffeine. Similarly, the effectiveness of the bean extractor can be measured by caffeine analyses of the raw green coffee and the decaffeinated beans, provided that the caffeine level in the decaffeinated extract is low.

Green coffee extract is a fertile medium for microbiological growth. Sanitary handling is essential to minimize contamination. In addition, the extract must be kept at elevated temperature of not less than about 75° C. to prevent deterioration.

Fresh coffee extract carries a small amount of insoluble solids including bits of chaff and particles of soil acquired by the beans on the plantation or in handling and transport. To prevent accumulation of these solids in the extraction column, the extract may be centrifuged before being fed to the column. Some of these solids are readily removed in a low speed centrifuge with a centrifugal force of 1000 times gravity, but a much better job is done with a higher speed unit at about 10,000 times gravity. The solids removed represent less than 1% of the dry weight of the green beans and some of that weight, the chaff, would later have been lost by burning during normal roasting. The removal of soil particles is believed to be responsible for an improved "cleaner" flavor in the decaffeinated roasted coffee as compared to the undecaffeinated coffee. A very small fraction of solid waxy material apparently derived from a natural coating on the beans is also preferably removed by centrifugation. Unlike the other removable solids, the density of the waxy material is less than that of the extract.

The yield of decaffeinated green coffee is better than 95% of the undecaffeinated beans fed to the system. The difference represents caffeine extracted, chaff and insoluble solids removed in the centrifuge, a trace amount of soluble material extracted with the caffeine, and a very small amount of fines blown away while drying the decaffeinated beans.

This invention provides the means for economically producing excellent quality decaffeinated coffee. Flavor and aroma present in undecaffeinated coffee is retained because processing time is short, conditions are gentle and contact with organic solvents is avoided. A high degree of decaffeination is readily attained, exceeding 99% if desired. The process is economical because it is continuous, the beans are not handled at elevated pressure, industrial flow rates are employed in the extractor, and the outturn of decaffeinated coffee exceeds 95% of the weight of undecaffeinated coffee.

The preferred system is further described in the following example.

Example

A complete pilot plant is constructed and operated employing the process disclosed. The principal equipment is arranged as shown in FIG. 2. All the equipment is constructed of 304 or 316 stainless steel or Inconel 600.

The extraction column 19 for extraction of caffeine from green coffee extract with carbon dioxide is a vertical cylinder 76 mm in diameter and 12.8m tall containing 40 plates, spaced 254 mm apart. Each plate has 59 perforations, 12 in FIG. 1, of 3.2 mm diameter arranged in triangular pitch on 6.4 mm centers. The total area of the perforations in each plate is 10.5% of the column cross-sectional area. An open tube of 21 mm inside diameter and 235 mm long is attached to each plate, serving as the downcomer 8. Each plate is fitted with a TFE Teflon sheet lip-seal gasket in contact with the inside wall of the column. The distance between plates is maintained by four spacer tubes 6 mm in diameter located between adjacent plates. Rods 3 mm in diameter pass through these tubes as well as through holes in the plates and extend the length of the column.

Near the bottom of each downcomer an orifice plate is installed containing three perforations, each of 3 mm diameter. The foam-breaking material is made of knitted stainless steel wire 0.108 mm in diameter and has a bulk density of 0.433 g/cm$^3$ and a surface area of about 20 square centimeters per cubic centimeter of mesh. About 250 g of this material is fitted between successive plates starting 90 mm above each plate and extending 150 mm upward. A portion of the mesh near the column wall is extended downward toward the plate to insure effective drainage of liquid formed by breaking of foam.

The column is pressurized with carbon dioxide maintained at 414 ±1 bar with an automatically controlled makeup pump. A separate circulating pump provides a flow of 2.80 kilograms per minute of carbon dioxide up through the column. This flow is equivalent to a velocity of 0.12 meters per second through the plate perforations. The carbon dioxide flow is sensed by a differential pressure transmitter which measures pressure drop across a section of the piping and controls an automatic throttling valve. The circulating pump also has an automatically regulated bypass valve which maintains a constant pressure drop across the throttling valve.

The green coffee extract containing caffeine is pumped to the top of the column. The speed of this pump is automatically controlled by a differential pressure transmitter which senses extract level at the top of the column. The extract flow rate of 4.5 liters per hour is maintained at the extract exit at the bottom of the column.

The column temperature of 82° C. is maintained by means of an automatically controlled, steam heated exchanger through which the carbon dioxide passes before entering the column. Also, four automatically controlled steam tracing lines are wrapped around the column and covered with insulation.

A second sieve plate column of the same design, 28 in FIG. 2, is used to wash the caffeine from the carbon dioxide. Deionized water is provided to the top of this second column by an automatic water pump and the water, laden with caffeine, exits the bottom at a controlled rate of 30 liters per hour. The temperature and pressure are close to those maintained in the coffee extract column.

Green coffee is fed at a constant rate of 3 kilograms per hour to one end of the bean extractor, 15 in FIG. 2. At the same end, extract at 25.4% solubles concentration and laden with caffeine exits. The extract is passed through a centrifuge to remove insoluble matter and then is pumped to the extract decaffeination column. The beans move through the bean extractor continuously with a residence time of about 6 hours and are maintained at 92° to 95° C. At the opposite end decaffeinated extract from the extract column enters and decaffeinated beans leave. The decaffeinated beans are continuously elevated with an inclined screw conveyor fitted with spray nozzles supplied with deionized water to wash off the decaffeinated extract which coats the wet beans. The dilute extract formed by the water wash flows down the screw conveyor and enters the bean extractor. Washed beans are discharged from the upper end of the screw conveyor into the bean drier. A vibrating fluid bed drier serves to dry the beans. The beans are supported on a vibrating deck provided with perforations to admit heated air from below for drying. The deck is 2.75m long. A 75 mm deep bed of beans is maintained in a fluidized state by the flow of drying air assisted by vibration of the deck. A bean temperature of about 95° C. is maintained near the entry point and the temperature is gradually reduced to about 80° C. as the beans move through the drier. They are then cooled to about 45° C. The bean residence time is about 1½ hours in the drier. The discharged beans have a moisture content of 8.8%.

It is necessary that the supply of extract provided by the bean extractor be matched to the demand for extract being fed to the extraction column. For this purpose a small tank is provided to hold a supply of extract before it is pumped to the column. A level sensor in the tank is used to automatically adjust the quantity of wash water used to wash the decaffeinated beans to maintain the required supply of extract.

A small amount of carbon dioxide becomes dissolved into both the decaffeinated extract and into the water carrying caffeine washed from the carbon dioxide. Most of this carbon dioxide can be recovered. Since in this example it is not being recovered, the amount lost is made up with carbon dioxide by the makeup pump described above.

In this example, the green coffee contains 1.09% caffeine. The dried decaffeinated beans containing 0.015% caffeine, calculated on an equal moisture basis, is 98.6% decaffeinated.

The discharge rate of decaffeinated beans under constant conditions for a period of three hours is at the rate of 2.895 kilograms per hour, corrected for the small difference in moisture between the decaffeinated and undecaffeinated coffees. This rate of discharge is only 3.5% less than the bean feed rate.

After roasting, the flavor quality and strength of the decaffeinated coffee is excellent, equaling the fine quality of the green coffee being fed to the process.

The invention is not limited to the precise details of structure shown and set forth in the preferred embodiments described, for obvious modifications will occur to those skilled in the art to which the invention pertains.

I claim:

1. A process for decaffeination of green coffee comprising the steps of:
    (a) extracting caffeine from green coffee beans by contacting the beans with a decaffeinated aqueous solution of green coffee to prepare an extract containing caffeine and other soluble components of green coffee and separating this extract from the green coffee beans now substantially freed of caffeine,
    (b) feeding said extract to above the uppermost plate of a perforated plate extraction column having a plurality of plates,
    (c) feeding supercritical carbon dioxide continuously to below the lowest plate of the said column at a velocity at which, foam, formed by intermixing of the green coffee extract and the supercritical carbon dioxide is broken by contact with a means for breaking foam comprising a porous extended solid surface placed above each perforated plate and extending across the column between successive plates,
    (d) withdrawing said supercritical carbon dioxide together with dissolved caffeine continuously from the top of the column to remove caffeine from the green coffee extract,
    (e) removing the aqueous green coffee extract, now substantially freed of caffeine, continuously from the bottom of the extraction column and recycling it to step (a) to decaffeinate additional green coffee beans,
    (f) maintaining the pressure within the said column at greater than about 330 bar,
    (g) maintaining the temperature within said column in the range of about 80° to 100° C.,
    (h) maintaining the concentration of green coffee extract in the column within the range of about 18 to 30 percent dissolved solids,
    (i) separating caffeine from the carbon dioxide exiting the top of the column and recycling carbon dioxide, substantially freed of caffeine, to below the lowest plate of the column.

2. The process for decaffeination of green coffee of claim 1 wherein the foam breaking means of step (c) comprises a mesh means comprising a surface area greater than about 12 square centimeters per cubic centimeter of mesh volume.

3. The process for decaffeination of green coffee of claim 1 wherein the foam breaking means of step (c) comprises a mesh means comprising knitted metal wire having a surface area greater than about 12 square centimeters per cubic centimeter of mesh volume.

4. The process for decaffeination of green coffee of claim 1 wherein the foam breaking means of step (c) comprises a mesh means comprising polytetrafluoroethylene having a surface area greater than about 12 square centimeters per cubic centimeter of mesh volume.

5. The process for decaffeination of green coffee of claim 1 wherein the foam breaking means of step (c) comprises a mesh means comprising 300 series stainless steel wire having a surface area greater than about 12 square centimeters per cubic centimeter of mesh volume.

6. The process for decaffeination of green coffee of claim 1 wherein the foam breaking means of step (c) comprises a mesh means comprising metal wire having a surface area of about 20 square centimeters per cubic centimeter of mesh volume.

7. The process for decaffeination of green coffee of claim 1 wherein the foam breaking means of step (c) comprises a mesh means comprising series 300 stainless steel wire having a diameter of about 0.10 millimeter, a mesh bulk density of about 0.43 gram per cubic centimeter, a void percentage of about 95 percent, and a surface area of about 20 square centimeters per cubic centimeter of mesh volume.

8. The process for decaffeination of green coffee of claim 1 wherein the foam breaking means of step (c) comprises a mesh means comprising a surface area greater than about 12 square centimeters per cubic centimeter of mesh volume and a vertical thickness of greater than about 75 millimeters.

9. The process for decaffeination of green coffee of claim 1 wherein the foam breaking means of step (c) comprises a mesh means comprising a surface area greater than about 12 square centimeters per cubic centimeter of mesh volume and a vertical thickness of about 150 millimeters.

10. The process for decaffeination of green coffee of claim 1 wherein the foam breaking means of step (c) compirses a mesh means comprising a surface area greater than about 12 square centimeters per cubic centimeter of mesh volume and a lower edge placed at or above the level of liquid on each of the perforated plates in the extraction column.

11. The process for decaffeination of green coffee of claim 1, 2, 3, 4, 5, 6, 7, 8, 9 or 10 wherein the pressure in step (f) is maintained at about 380 bar.

12. The process for decaffeination of green coffee of claim 1, 2, 3, 4, 5, 6, 7, 8, 9 or 10 wherein the pressure in step (f) is maintained at about 420 bar.

13. The process for decaffeination of green coffee of claims 1, 2, 3, 4, 5, 6, 7, 8, 9 or 10 wherein the temperature in step (g) is maintained in the range of about 80° to 85° C.

14. The process for decaffeination of green coffee of claim 1, 2, 3, 4, 5, 6, 7, 8, 9 or 10 wherein the concentration of the extract in step (h) is maintained in the range of about 22 to 27 percent dissolved solids.

15. The process for decaffeination of green coffee of claims 1, 2, 3, 4, 5, 6, 7, 8, 9 or 10 wherein the concentration of the extract in step (h) is maintained in the range of about 26 percent dissolved solids.

16. The process for decaffeination of green coffee of claims 1, 2, 3, 4, 5, 6, 7, 8, 9 or 10 wherein supercritical carbon dioxide in step (c) is fed at a rate to maintain a velocity of about 0.1 to 0.15 meters per second through the perforations in the plates in the column.

* * * * *